US012612807B2

(12) United States Patent
Szegeny

(10) Patent No.: US 12,612,807 B2
(45) Date of Patent: Apr. 28, 2026

(54) MOTOR VEHICLE LOCK, IN PARTICULAR MOTOR VEHICLE DOOR LOCK

(71) Applicant: KIEKERT AKTIENGESELLSCHAFT, Heiligenhaus (DE)

(72) Inventor: Peter Szegeny, Engelskirchen (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 120 days.

(21) Appl. No.: 18/293,041

(22) PCT Filed: Aug. 19, 2022

(86) PCT No.: PCT/DE2022/100620
§ 371 (c)(1),
(2) Date: Jan. 29, 2024

(87) PCT Pub. No.: WO2023/036364
PCT Pub. Date: Mar. 16, 2023

(65) Prior Publication Data

US 2024/0376754 A1 Nov. 14, 2024

(30) Foreign Application Priority Data

Sep. 9, 2021 (DE) ..................... 10 2021 123 329.1

(51) Int. Cl.
*E05B 81/14* (2014.01)
*E05B 81/06* (2014.01)
(Continued)

(52) U.S. Cl.
CPC .............. *E05B 81/14* (2013.01); *E05B 81/06* (2013.01); *E05B 81/30* (2013.01); *E05B 81/34* (2013.01); *E05B 81/44* (2013.01)

(58) Field of Classification Search
CPC .......... E05B 81/14; E05B 81/06; E05B 81/30; E05B 81/34; E05B 81/44
See application file for complete search history.

(56) References Cited

U.S. PATENT DOCUMENTS

2020/0325706 A1* 10/2020 Inan ........................ E05B 81/42
2021/0355717 A1* 11/2021 Inan ........................ E05B 85/26

FOREIGN PATENT DOCUMENTS

CN 109972939 A 7/2019
DE 10100008 A1 7/2002
(Continued)

OTHER PUBLICATIONS

Machine translation with numbered paragraphs of EP1421246B1 description (Year: 2010).*
(Continued)

*Primary Examiner* — Christine M Mills
*Assistant Examiner* — Christopher F Callahan
(74) *Attorney, Agent, or Firm* — Renner, Otto, Boisselle & Sklar, LLP.

(57) ABSTRACT

A motor vehicle lock, in particular a motor vehicle door lock, preferably an electric lock, which is equipped with an electromotive drive and a locking mechanism that can be actuated by the drive and consists substantially of a rotary latch and a pawl. The drive is provided with at least one evoloid gear stage. According to the invention, a latching element, which is mounted on the rotary latch and/or the pawl so as to be pivotable primarily in a locking mechanism plane, is arranged in the engagement region between the rotary latch and the pawl.

12 Claims, 2 Drawing Sheets

(51) Int. Cl.
*E05B 81/30* (2014.01)
*E05B 81/34* (2014.01)
*E05B 81/44* (2014.01)

(56) References Cited

FOREIGN PATENT DOCUMENTS

| | | | | | |
|---|---|---|---|---|---|
| DE | 102014003106 | A1 | | 9/2015 | |
| DE | 102017124525 | A1 | | 4/2019 | |
| DE | 102017125819 | A1 | * | 5/2019 | ............. E05B 81/34 |
| DE | 102019109488 | A1 | | 10/2020 | |
| DE | 102019116441 | A1 | | 12/2020 | |
| DE | 102019123825 | A1 | | 3/2021 | |
| DE | 102019126570 | A1 | | 4/2021 | |
| DE | 102019128637 | A1 | | 4/2021 | |
| DE | 102020101362 | A1 | | 7/2021 | |
| EP | 1421246 | B1 | * | 10/2010 | ............. E05B 81/14 |
| WO | 2020083435 | A1 | | 4/2020 | |
| WO | 2020083439 | A1 | | 4/2020 | |
| WO | WO-2020253912 | A1 | * | 12/2020 | ............. E05B 81/06 |

OTHER PUBLICATIONS

Machine translation with numbered paragraphs of WO2020253912A1 (Year: 2020).*
International Search Report mailed Nov. 25, 2022, for priority International Application No. PCT/DE2022/100620.

* cited by examiner

MOTOR VEHICLE LOCK, IN PARTICULAR MOTOR VEHICLE DOOR LOCK

This application is a national phase of International Patent Application No. PCT/DE2022/100620 filed Aug. 19, 2022, which claims priority to German Patent Application No. 10 2021 123 329.1 filed Sep. 9, 2021, each of which is hereby incorporated herein by reference in its entirety.

FIELD OF DISCLOSURE

The invention relates to a motor vehicle lock, in particular a motor vehicle door lock, and preferably an electric lock, having an electromotive drive, and having a locking mechanism which can be actuated by the drive, consisting substantially of a rotary latch and pawl, wherein the drive is equipped with at least one evoloid gear stage.

BACKGROUND OF DISCLOSURE

Motor vehicle locks and in particular motor vehicle door locks and preferably electric locks are characterized by particularly convenient operation. Since the locking mechanism consisting of a rotary latch and pawl is not (no longer) mechanically opened in such motor vehicle locks, but rather by an electric motor, not only is comfort increased and the actuating forces are reduced, but particularly quiet operation overall is also observed. The opening process can be initiated by, for example, a sensor in the region of an outside door handle or also during a “keyless entry access.”

This offers the additional advantage that aerodynamically optimized motor vehicle exterior doors can be used in this connection, because ultimately a mechanically operating external door handle is unnecessary. For this reason, such electric locks or motor vehicle locks are increasingly used with an electromotive drive for the locking mechanism consisting of a rotary latch and pawl. An example of such an electric lock is disclosed in DE 101 00 008 A1.

With electric locks of this type, it is in fact important to ensure perfect power transmission from the electromotive drive to the locking mechanism. As a rule, the electromotive drive ensures that the pawl is lifted from its engagement with the rotary latch. This requires more or less large opening forces. For this reason, the aforementioned prior art according to DE 101 00 008 A1 works not only with a pawl lever operatively connected to the pawl, but additionally also a reduction gear as a component of the electromotive drive. This is because the electric motors used at this point as components of the electromotive drive are limited in their power for reasons of space and cost.

In the generic prior art according to DE 10 2019 126 570 A1, there are already approaches to realizing, in conjunction with a drive assembly for a motor vehicle lock with an actuating lever mechanism for triggering a locking mechanism and a main drive operating on the actuating lever mechanism, an additional auxiliary drive for emergency unlocking/emergency opening of the locking mechanism. For this purpose, the auxiliary drive is equipped with a gearbox which provides a high gear ratio. At least one gear stage of the gearbox is designed as an evoloid stage.

Such evoloid gear stages are characterized not only by a compact design, but also a large gear ratio spread. In fact, not only a compact design, but at the same time a large gear ratio, can be realized.

At this point, however, there is still a need for improvement, because there is still a tendency to reduce the electric motor with regard to its size and weight and thus also costs.

This requires further optimized electromotive drives in this context. This is where the invention aims to remedy the situation.

SUMMARY OF DISCLOSURE

The invention is based on the technical problem of further developing such a motor vehicle lock and in particular a motor vehicle door lock in such a way that overall, further optimization with regard to the actuating forces is observed, so that cost and weight advantages can additionally be claimed as a result thereof.

To solve this technical problem, the invention proposes, in a generic motor vehicle lock and in particular a motor vehicle door lock, that a latching element is arranged in the engagement region between the rotary latch and the pawl, which is pivotably mounted on the rotary latch and/or the pawl mostly in a locking mechanism plane.

The invention thus initially works with an electromotive drive already optimized with regard to compactness and achievable gear ratio, which is specifically equipped with at least one evoloid gear stage. In addition to this, the engagement region between the rotary latch and the pawl is further optimized with regard to the required opening forces, in particular during electrical opening. The contact region between the rotary latch and the pawl is optimized, specifically with regard to the opening forces required to open the locking mechanism because of the latching element present in the engagement region between the rotary latch and the pawl and its pivotable mounting on the rotary latch and/or the pawl largely in the locking mechanism plane. In fact, at this point and in contrast to the previous state of the art, there is (no longer) a frictional movement of the pawl and rotary latch against each other in the course of the opening process according to the invention. Such a friction movement is therefore associated with great frictional forces, because the rotary latch and the pawl are usually stamped components made of high-strength steel.

In contrast thereto, in this connection, the invention provides a latching element which is provided in the engagement region between the rotary latch and the pawl, which is also pivotably mounted on the rotary latch or the locking pawl largely in the locking plane. As a result, during the opening process of the locking mechanism and the associated lifting of the pawl from its engagement with the rotary latch, a rolling movement occurs instead of a friction movement between the pawl and the rotary latch. This is because during this process, the latching element provided in the engagement region is pivoted, so that as a result, the pawl can be lifted from its engagement with the rotary latch with a significantly reduced force compared to the existing prior art. A friction-optimized opening process of the locking mechanism is thereby observed.

The friction-optimized opening process of the locking mechanism now means that overall, in conjunction with the specifically designed electromotive drive with the at least one evoloid gear stage, the electric motor can be further reduced in terms of its available electrical power compared to previous embodiments. As a result, the design can be realized more compactly and with less weight and reduced costs compared to the previous procedures.

In fact, the procedure is usually such that the electromotive drive has exactly one evoloid gear stage. For this purpose, the electromotive drive is typically equipped with an electric motor and an output pulley, wherein the evoloid gear stage is realized between a worm on an output shaft of the electric motor and the output pulley. That is to say, only a single evoloid gear stage is advantageously used at this point, namely between the worm on the output shaft of the electric motor on the one hand and an evoloid toothing on the outer circumference of the output pulley on the other hand.

With the aid of such an evoloid gear stage, reduction ratios of 10:1 or even more can be realized without difficulty. That is, 10 revolutions or even more of the electric motor or the worm arranged on its output shaft are converted into only one revolution of the output pulley. In most cases, even greater reduction ratios of 20:1, 30:1 or even more can be realized without difficulty. A relatively high torque for opening the locking mechanism can thereby be provided on the pawl, even when working with a small, compact and low-power electric motor with low weight.

In this connection, the output pulley is generally equipped on the outer circumference with evoloid teeth inclined with respect to its rotational axis. In addition, the output pulley generally has an actuating contour for the relevant actuating lever on its end face facing an actuating lever. That is to say, the output pulley carries out rotary movements in the clockwise or counterclockwise direction about its axis of rotation, which are transmitted via the actuating contour to the actuating lever. Since the actuating lever generally slides along the actuating contour of the output pulley with a cam, the actuating lever can thereby be acted upon with a pivoting movement. In this connection, the actuating contour is advantageously designed to be helical with a helical axis. It has proven successful if the helical axis of the actuating contour coincides with the axis of rotation of the output pulley.

In this way, the helical axis of the actuating contour and the axis of rotation of the output pulley coincide on the end face of the output pulley facing the actuating lever. The design is thereby such that the helical actuating contour about the axis of rotation of the output pulley describes a three-dimensional helical line. Since the front-side cam of the actuating lever rests against the actuating contour, the actuating lever is increasingly pivoted when the cam migrates along the three-dimensional helical line described above.

Since the actuating lever usually interacts with a release lever actuating the pawl, the pivoting movement of the actuating lever caused in this way can consequently be transmitted to the release lever which, as a result, then in turn lifts the pawl from its engagement with the rotary latch. Since in this connection the pivotable latching element is provided in the engagement region between the rotary latch and the pawl, the described opening process is particularly low-friction.

In this connection, it has proven useful if the actuating lever and the release lever are mounted on the same axis. In principle, the actuating lever and the release lever can also coincide and define a lever. This supports the overall realized compact design. The fact that the worm on the output shaft of the electric motor usually has a plurality of evoloid teeth also contributes to this. The evoloid teeth are beveled in such a way that at least one evoloid tooth of the output shaft always engages in the evoloid toothing on the outer circumference of the output pulley. At this point, it has proven useful if the worm on the output shaft has a maximum of three evoloid teeth. Of course, this only applies as an example.

The subject of the invention is also the use of a latching element in the engagement region between the rotary latch and the pawl in a motor vehicle lock and in particular a motor vehicle door lock, as described in claim 10.

As a result, a motor vehicle lock and, in particular, a motor vehicle door lock with optimized opening ratios compared to the prior art is provided and implemented. In fact, the electromotive drive works with at least one evoloid gear stage and is additionally realized in the engagement region between the rotary latch and the pawl, the pivotable latching element. As a result, not only is an electromotive drive made available with high reduction ratios, but at the same time, a friction-optimized engagement region between the rotary latch and the pawl.

At this point, the fact that the worm on the output shaft of the electric motor, the output pulley as a whole and the actuating lever and release lever are generally made of plastic has a complementary and advantageous effect. This is because a friction of "plastic-plastic" is observed between the head-side cam of the actuating lever and the actuating contour. Likewise between the evoloid teeth of the worm on the output shaft and the evoloid teeth on the outer circumference of the output pulley, so that additional friction optimization is thereby observed. These are the main advantages.

BRIEF DESCRIPTION OF DRAWINGS

The invention is explained in greater detail below with reference to drawings which show only one embodiment.

In the drawings.

DETAILED DESCRIPTION

Figure 1:
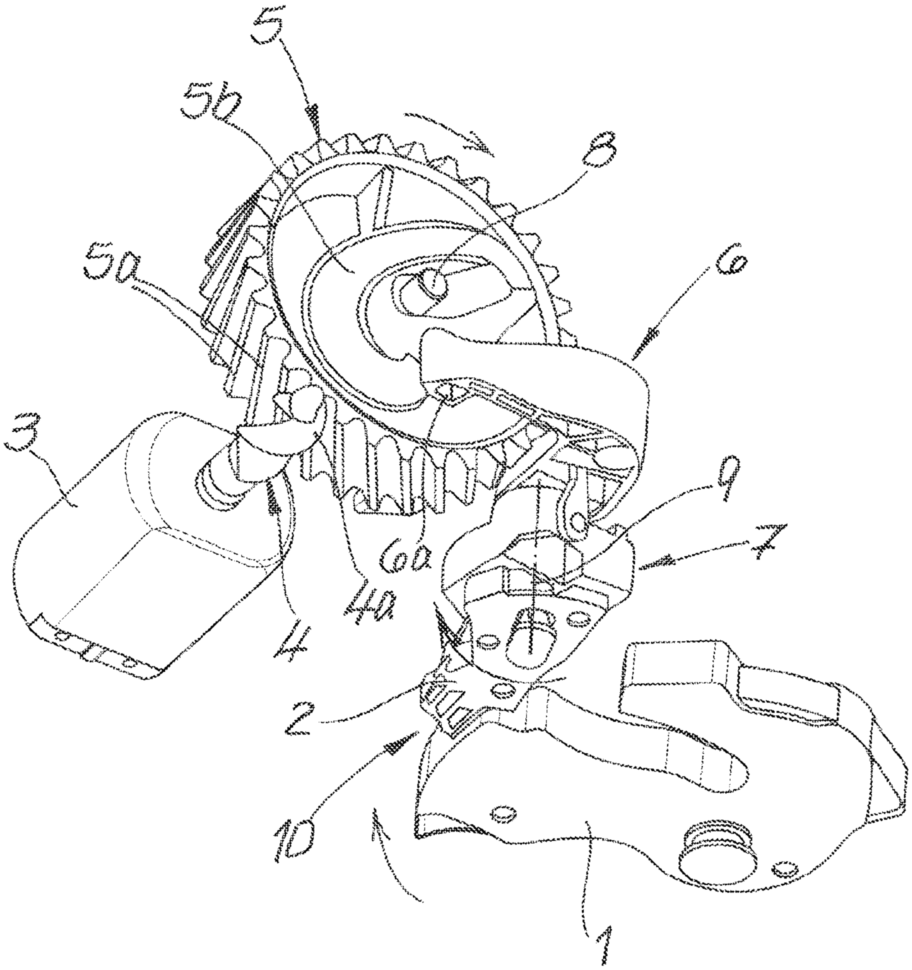
FIG. 1 shows a perspective overview of the motor vehicle lock according to the invention.

In the figures, a motor vehicle lock and in particular a motor vehicle door lock is shown, which is a so-called electric lock, i.e. one in which an associated locking mechanism 1, 2 consisting of rotary latch 1 and pawl 2 is opened electrically. Furthermore, an electromotive drive 3, 4, 5 is implemented. The electromotive drive 3, 4, 5 operates on an actuating lever mechanism 6, 7 in order to use it to lift the pawl 2 from its latching engagement shown in FIG. 1 with the rotary latch 1, as will be explained in more detail below.

For this purpose, the electromotive drive 3, 4, 5 is equipped with at least one evoloid gear stage 4*a*, 5*a*. In the context of the exemplary embodiment, a single evoloid gear stage 4*a*, 5*a* is realized. This is found between a worm 4 on an output shaft of an electric motor 3 as a component of the electromotive drive 3, 4, 5 on the one hand, and an output pulley 5 as an additional component of the electromotive drive 3, 4, 5 on the other hand. In fact, both said worm 4 and the output pulley 5 are each equipped with evoloid teeth 4*a*, 5*a*, which together define the single evoloid gear stage 4*a*, 5*a* within the scope of the embodiment.

For this purpose, the evoloid teeth 4*a* are located along the entire outer circumference and over the entire length of the worm 4 on the output shaft of the electric motor 3. In contrast, the evoloid teeth 5*a* are provided and arranged on the outer circumference on the output pulley 5, specifically inclined in comparison with an axis of rotation 8 of the output pulley 5. The output pulley 5 is also equipped with an actuating contour 5*b*, namely on its end face facing an actuating lever mechanism 6, 7. The actuating contour 5*b* is one that is helical in nature and with an associated helical axis 8 which, according to the exemplary embodiment, coincides with the axis of rotation 8 of the output pulley 5. In fact, the design is such that the helical actuating contour 5*b* in relation to the helical axis or axis of rotation 8 of the output pulley 5 overall describes a three-dimensional helical line.

The actuating lever mechanism 6, 7 is composed substantially of an actuating lever 6 and a release lever 7 interacting with the pawl 2 and acting on it. The actuating lever 6 is equipped with a front-side cam 6*a*, which slides along the helical actuating contour 5*b* or is acted upon by means of the helical actuating contour 5*b*. As a result of this, and with a clockwise movement of the output pulley 5 about the axis of rotation 8 indicated in FIG. 1, the cam 6*a* consequently moves along the three-dimensional helical line or the actuating contour 5*b*, and the actuating lever 6 is thereby pivoted clockwise about its axis 9. Since the actuating lever 6 and the release lever 7 are mounted coaxially to one another and with respect to the common axis 9, the actuating lever 7 follows the clockwise movement of the actuating lever 6 and ensures overall that the pawl 2 is also pivoted in the clockwise direction indicated in FIG. 1. This is because the release lever 7 is non-rotatably coupled to the actuating lever 6.

As a result, the pawl 2 is lifted by the rotary latch 1 from its latching engagement shown in FIG. 1 in the closed state of the locking mechanism 1, 2. The pawl 2 moves about the common axis 9 together with the release lever 7 and the actuating lever 6. Then the rotary latch 1 opens in a spring-assisted manner, and releases a previously caught locking pin (not expressly shown). The associated motor vehicle door is opened.

The worm 4 on the output shaft of the electric motor 3 has a plurality of evoloid teeth 4*a* on its outer circumference and along its extension. The evoloid teeth 4*a* are beveled in such a way that at least one of these evoloid teeth 4*a* always engages in the outer circumferential evoloid toothing of the output pulley 5 or the evoloid teeth 5*a* there. According to the exemplary embodiment, the worm 4 has a maximum of three evoloid teeth 4*a* on the output shaft of the electric motor 3. Of course, this only applies as an example. The reduction ratio achieved at this point can be values of generally more than 10:1, in particular even 20:1 or even preferably 30:1 and more.

Figure 2:
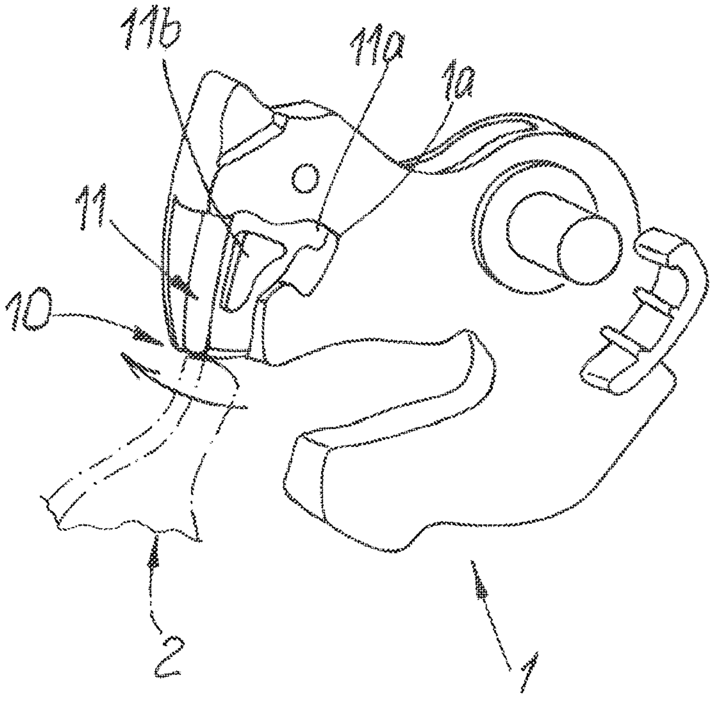
FIG. 2 shows a detailed view of the locking mechanism.

According to the invention, the design is such that, according to the representation in FIG. 2, a latching element 11 is arranged in the engagement region 10 between the rotary latch 1 and the pawl 2. According to the exemplary embodiment, the latching element 11 is pivotably mounted on the rotary latch 1, namely largely in a locking mechanism plane spanned by the rotary latch 1 and the pawl 2. It can be seen from the illustration in FIG. 2 that, for this purpose, the latching element 11 plunges with a pivot bearing head 11*a* into a recess 1*a* of the rotary latch 1 and can thus perform the corresponding pivoting movements. Consequently, if the pawl 2 is lifted from its latching engagement with the rotary latch 1, this means that the latching element 11 performs the pivoting movement indicated in FIGS. 1 and 2, so that the pawl 2 can thereby be lifted from its engagement with the rotary latch 1 in a particularly low-friction manner.

For this purpose, the latching element 11 may have a guide extension 11*b* which projects relative to the locking mechanism plane and which ensures the additionally axial and/or radial guidance of the latching element 11. The relevant guide extension 11*b* can be designed as an embossing, for example. In addition, a casing or a component of the rotary latch 1 may provide axial securing of the pivotable latching element 11, but this is not shown in detail.

LIST OF REFERENCE NUMBERS

Locking mechanism 1, 2
Rotary latch 1
Recess 1*a*
Pawl 2
Drive 3, 4, 5
Electric motor 3
Worm 4
Driven pulley 5
Evoloid gear stage 4*a*, 5*a*
Actuating contour 5*b*
Operating lever mechanism 6, 7
Actuation lever 6
Cam 6*a*
Release lever 7
Axis of rotation 8
Axis 9
Engagement region 10
Detent element 11
Pivot bearing head 11*a*
Guide extension 11*b*

The invention claimed is:

1. A motor vehicle lock comprising:
an electromotive drive,
a locking mechanism which is actuated by the electromotive drive, the locking mechanism including a rotary latch and a pawl, wherein the electromotive drive has at least one evoloid gear stage,
a latching element arranged in an engagement region between the rotary latch and the pawl, and the latching element is pivotably mounted on the rotary latch and/or the pawl at least in part in a plane of the locking mechanism,
an actuating lever actuated by the electromotive drive, and
a release lever that interacts with the actuating lever and acts on the pawl,
wherein the actuating lever, the release lever, and the pawl are mounted coaxially on a common axis.

2. The motor vehicle lock according to claim 1, wherein the electromotive drive has an electric motor and an output pulley, and wherein the evoloid gear stage comprises a worm on an output shaft of the electric motor and an outer portion of the output pulley.

3. The motor vehicle lock according to claim 2, wherein the output pulley has an outer circumference with evoloid teeth that are inclined with respect to an axis of rotation of the output pulley.

4. The motor vehicle lock according to claim 2, wherein the output pulley has an actuating contour for actuating the actuating lever on an end face facing the actuating lever.

5. The motor vehicle lock according to claim 4, wherein the actuating contour is helical with a helical axis.

6. The motor vehicle lock according to claim 5, wherein the helical axis of the actuating contour coincides with an axis of rotation of the output pulley.

7. The motor vehicle lock according to claim 2, wherein the worm has a plurality of evoloid teeth on the output shaft of the electric motor which are beveled in such a way that at least one evoloid tooth engages in outer circumferential evoloid toothing of the output pulley.

8. The motor vehicle lock according to claim 2, wherein evoloid teeth are located along an entire outer circumference and over an entire length of the worm, and evoloid teeth are arranged on the outer circumference on the output pulley.

9. The motor vehicle lock according to claim 1, wherein the latching element has a pivot bearing head that engages in a recess of the rotary latch.

10. The motor vehicle lock according to claim 1, wherein the latching element has a guide extension that projects relative to the plane of the locking mechanism to provide radial and/or axial guidance of movement of the latching element.

11. The motor vehicle lock according to claim 10, wherein the guide extension is an embossing on a surface of the latching element.

12. The motor vehicle lock according to claim 1, wherein the electromotive drive has one evoloid gear stage between an electric motor and an output pulley engaged by the actuating lever.

* * * * *